United States Patent
Patterson et al.

(10) Patent No.: US 8,554,685 B2
(45) Date of Patent: Oct. 8, 2013

(54) METHOD AND SYSTEM USING UNIVERSAL ID AND BIOMETRICS

(75) Inventors: Barbara E. Patterson, South San Francisco, CA (US); Phillip L. Kumnick, Phoenix, AZ (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 13/363,332

(22) Filed: Jan. 31, 2012

(65) Prior Publication Data

US 2012/0123944 A1     May 17, 2012

Related U.S. Application Data

(63) Continuation of application No. 13/243,288, filed on Sep. 23, 2011.

(60) Provisional application No. 61/386,432, filed on Sep. 24, 2010.

(51) Int. Cl.
*G06Q 20/42*        (2012.01)

(52) U.S. Cl.
USPC .............................. 705/52; 705/44; 705/59

(58) Field of Classification Search
USPC ................................................ 705/44, 52
See application file for complete search history.

(56) References Cited

U.S. PATENT DOCUMENTS

| | | | |
|---|---|---|---|
| 5,399,874 A | 3/1995 | Gonsalves et al. | |
| 5,613,012 A | 3/1997 | Hoffman et al. | |
| 5,615,277 A | 3/1997 | Hoffman | |
| 5,668,897 A | 9/1997 | Stolfo | |
| 5,737,439 A | 4/1998 | Lapsley et al. | |
| 5,764,789 A | 6/1998 | Pare et al. | |
| 5,785,353 A | 7/1998 | Diamond | |
| 5,802,199 A | 9/1998 | Pare et al. | |
| 5,805,719 A | 9/1998 | Pare et al. | |
| 5,838,812 A | 11/1998 | Pare et al. | |
| 5,870,723 A | 2/1999 | Pare et al. | |
| 5,974,548 A | 10/1999 | Adams | |
| 5,982,914 A | 11/1999 | Lee et al. | |
| 6,012,039 A | 1/2000 | Hoffman et al. | |
| D425,873 S | 5/2000 | Anderson et al. | |
| 6,131,464 A | 10/2000 | Pare et al. | |
| 6,154,879 A | 11/2000 | Pare et al. | |
| 6,192,142 B1 | 2/2001 | Pare et al. | |

(Continued)

FOREIGN PATENT DOCUMENTS

| AU | 750154 B2 | 11/2002 |
|---|---|---|
| JP | 2009-099004 A | 5/2009 |

(Continued)

OTHER PUBLICATIONS

U.S. Appl. No. 13/243,288 unpublished, filed Sept. 23, 2011, Patterson.

(Continued)

*Primary Examiner* — Evens J Augustin
(74) *Attorney, Agent, or Firm* — Kilpatrick Townsend & Stockton LLP

(57) ABSTRACT

A universal ID and biometrics systems and methods are disclosed. A method includes receiving an authentication request message originating from a user. The authentication request message includes a first identifier and a second identifier, where the second identifier includes biometric data. The method further includes determining a third identifier based on the first identifier and sending the second and third identifiers to a first server computer to determine if the second and third identifiers have a predetermined correlation. The method further includes receiving confirmation of user authentication if the identification system determines that the second and third identifiers have the predetermined correlation.

20 Claims, 7 Drawing Sheets

(56) References Cited

U.S. PATENT DOCUMENTS

| | | |
|---|---|---|
| 6,209,104 B1 | 3/2001 | Jalili |
| 6,230,148 B1 | 5/2001 | Pare et al. |
| 6,233,684 B1 | 5/2001 | Stefik |
| 6,269,348 B1 | 7/2001 | Pare et al. |
| 6,314,521 B1 | 11/2001 | Debry |
| 6,351,815 B1 | 2/2002 | Adams |
| 6,366,682 B1 | 4/2002 | Hoffman et al. |
| 6,397,198 B1 | 5/2002 | Hoffman et al. |
| 6,411,728 B1 | 6/2002 | Lee et al. |
| 6,487,301 B1 | 11/2002 | Zhao |
| 6,510,453 B1 | 1/2003 | Apfel et al. |
| 6,567,530 B1 | 5/2003 | Keronen et al. |
| 6,581,042 B2 | 6/2003 | Pare et al. |
| 6,591,002 B2 | 7/2003 | Lee et al. |
| 6,594,376 B2 | 7/2003 | Hoffman et al. |
| 6,662,166 B2 | 12/2003 | Pare et al. |
| 6,728,397 B2 | 4/2004 | McNeal |
| 6,785,815 B1 | 8/2004 | Serret-Avila et al. |
| 6,862,583 B1 | 3/2005 | Mazzagatte et al. |
| 6,879,966 B1 | 4/2005 | Lapsley et al. |
| 6,920,435 B2 | 7/2005 | Hoffman et al. |
| 6,950,810 B2 | 9/2005 | Lapsley et al. |
| 6,957,770 B1 | 10/2005 | Robinson |
| 6,980,670 B1 | 12/2005 | Hoffman et al. |
| 6,985,608 B2 | 1/2006 | Hoffman et al. |
| 7,004,389 B1 | 2/2006 | Robinson et al. |
| 7,082,415 B1 | 7/2006 | Robinson et al. |
| 7,152,045 B2 | 12/2006 | Hoffman |
| 7,152,047 B1 | 12/2006 | Nagel |
| 7,185,807 B1 | 3/2007 | Robinson et al. |
| 7,215,832 B1 | 5/2007 | Yamaguchi |
| 7,236,610 B1 | 6/2007 | Luo et al. |
| 7,248,719 B2 | 7/2007 | Hoffman et al. |
| 7,269,737 B2 | 9/2007 | Robinson |
| 7,287,158 B2 * | 10/2007 | Futamura et al. ............ 713/156 |
| 7,319,987 B1 | 1/2008 | Hoffman et al. |
| 7,367,049 B1 | 4/2008 | Robinson et al. |
| 7,373,330 B1 | 5/2008 | Klebe |
| 7,383,441 B2 | 6/2008 | Vorbruggen et al. |
| 7,387,240 B2 | 6/2008 | Ziegler |
| 7,389,269 B1 | 6/2008 | Robinson et al. |
| 7,427,019 B2 | 9/2008 | Haertel |
| 7,437,330 B1 | 10/2008 | Robinson et al. |
| 7,464,059 B1 | 12/2008 | Robinson et al. |
| 7,483,862 B1 * | 1/2009 | Robinson et al. ............ 705/52 |
| 7,497,372 B1 | 3/2009 | Robinson et al. |
| 7,502,761 B2 | 3/2009 | Siegal et al. |
| 7,512,567 B2 | 3/2009 | Bemmel et al. |
| 7,526,652 B2 | 4/2009 | Ziegler |
| 7,533,066 B1 | 5/2009 | Robinson et al. |
| 7,533,809 B1 | 5/2009 | Robinson et al. |
| 7,536,352 B2 | 5/2009 | Lapsley et al. |
| 7,542,590 B1 | 6/2009 | Robinson et al. |
| 7,545,621 B2 | 6/2009 | Haddad |
| 7,558,406 B1 | 7/2009 | Robinson et al. |
| 7,558,407 B2 | 7/2009 | Hoffman et al. |
| 7,565,329 B2 | 7/2009 | Lapsley et al. |
| 7,606,401 B2 | 10/2009 | Hoffman et al. |
| 7,613,659 B1 | 11/2009 | Hoffman et al. |
| 7,620,605 B2 | 11/2009 | Hoffman et al. |
| 7,624,073 B1 | 11/2009 | Robinson et al. |
| 7,631,193 B1 | 12/2009 | Hoffman |
| 7,698,567 B2 | 4/2010 | Hoffman |
| 7,747,528 B1 | 6/2010 | Robinson et al. |
| 7,765,164 B1 | 7/2010 | Robinson et al. |
| 7,769,695 B2 | 8/2010 | Robinson et al. |
| 7,778,933 B2 | 8/2010 | Robinson et al. |
| 7,831,468 B1 | 11/2010 | Conte et al. |
| 7,836,485 B2 | 11/2010 | Robinson et al. |
| 7,882,032 B1 | 2/2011 | Hoffman |
| 7,905,396 B2 * | 3/2011 | Tidwell et al. ............ 235/379 |
| 7,970,678 B2 | 6/2011 | Lapsley |
| 8,015,118 B1 | 9/2011 | Robinson et al. |
| 2001/0051920 A1 | 12/2001 | Joao et al. |
| 2002/0024714 A1 | 2/2002 | Sandstrom et al. |
| 2002/0026577 A1 * | 2/2002 | Futamura et al. ............ 713/156 |
| 2002/0042884 A1 | 4/2002 | Wu et al. |
| 2002/0091642 A1 | 7/2002 | Rahnasto |
| 2002/0112177 A1 * | 8/2002 | Voltmer et al. ............ 713/200 |
| 2002/0152169 A1 | 10/2002 | Dutta et al. |
| 2003/0037261 A1 | 2/2003 | Meffert et al. |
| 2003/0061172 A1 | 3/2003 | Robinson |
| 2003/0093790 A1 | 5/2003 | Logan et al. |
| 2003/0182246 A1 | 9/2003 | Johnson et al. |
| 2004/0022444 A1 | 2/2004 | Rhoads |
| 2004/0073510 A1 | 4/2004 | Logan et al. |
| 2004/0117627 A1 | 6/2004 | Brewington |
| 2005/0125338 A1 * | 6/2005 | Tidwell et al. ............ 705/39 |
| 2006/0106734 A1 | 5/2006 | Hoffman |
| 2006/0123465 A1 * | 6/2006 | Ziegler ............ 726/2 |
| 2006/0265602 A1 | 11/2006 | Robinson |
| 2007/0154190 A1 | 7/2007 | Gilley et al. |
| 2007/0156696 A1 | 7/2007 | Lim |
| 2007/0162337 A1 | 7/2007 | Hawkins |
| 2007/0208662 A1 | 9/2007 | Jeronimus et al. |
| 2007/0226146 A1 | 9/2007 | Ruul |
| 2007/0282677 A1 | 12/2007 | Carpenter |
| 2007/0288319 A1 * | 12/2007 | Robinson et al. ............ 705/14 |
| 2007/0288320 A1 | 12/2007 | Cooper |
| 2008/0022416 A1 | 1/2008 | Yamauchi et al. |
| 2008/0046368 A1 * | 2/2008 | Tidwell et al. ............ 705/44 |
| 2008/0097851 A1 | 4/2008 | Bemmel |
| 2008/0147481 A1 | 6/2008 | Robinson |
| 2008/0271116 A1 | 10/2008 | Robinson et al. |
| 2009/0070270 A1 | 3/2009 | Robinson et al. |
| 2009/0074256 A1 | 3/2009 | Haddad |
| 2009/0099944 A1 | 4/2009 | Robinson |
| 2009/0138366 A1 | 5/2009 | Bemmel |
| 2009/0156170 A1 | 6/2009 | Rossano et al. |
| 2009/0158136 A1 | 6/2009 | Rossano et al. |
| 2009/0171827 A1 * | 7/2009 | Callahan et al. ............ 705/35 |
| 2009/0177587 A1 | 7/2009 | Siegal |
| 2009/0198587 A1 | 8/2009 | Wagner et al. |
| 2009/0228362 A1 | 9/2009 | Lapsley |
| 2010/0049659 A1 | 2/2010 | Cassone |
| 2011/0000961 A1 * | 1/2011 | McNeal ............ 235/382 |

FOREIGN PATENT DOCUMENTS

| | | |
|---|---|---|
| WO | WO 96/36934 A1 | 11/1996 |
| WO | WO 98/09227 A1 | 3/1998 |
| WO | WO 98/15924 A1 | 4/1998 |
| WO | WO 98/41947 A1 | 9/1998 |
| WO | WO 99/31621 A1 | 6/1999 |
| WO | WO 00/26849 A1 | 5/2000 |
| WO | WO 00/45247 A1 | 8/2000 |
| WO | WO 00/45320 A1 | 8/2000 |
| WO | WO 00/46710 A1 | 8/2000 |
| WO | WO 00/46737 A1 | 8/2000 |
| WO | WO 00/67187 A1 | 11/2000 |
| WO | WO 01/06440 A1 | 1/2001 |
| WO | WO 01/20531 A1 | 3/2001 |
| WO | WO 02/14984 A2 | 2/2002 |
| WO | 2005/098741 A2 | 10/2005 |
| WO | WO2005/098741 A2 | 10/2005 |
| WO | WO 2007/092715 A2 | 8/2007 |
| WO | WO 2008/002979 A2 | 1/2008 |

OTHER PUBLICATIONS

"Micro-ATM Standards" Working Group on Technology Issues, version 1.0 (draft) (Mar. 27, 2010).

International Search Report and Written Opinion mailed Apr. 27, 2012, PCT/US2011/053103, 11 pages.

U.S. Appl. No. 10/678,646, filed Oct. 6, 2003 (31 pages).

International Search Report and Written Opinion for application PCT/US2011/053103 (Apr. 27, 2012).

Office Action mailed Apr. 25, 2013 in U.S. Appl. No. 13/243,288, 12 pages.

* cited by examiner

US 8,554,685 B2

METHOD AND SYSTEM USING UNIVERSAL ID AND BIOMETRICS

CROSS-REFERENCES TO RELATED APPLICATIONS

The present non-provisional application is a continuation of and claims the benefit under 35 U.S.C. §120 of U.S. patent application Ser. No. 13/243,288, filed on Sep. 23, 2011, and entitled "Method and System Using Universal ID and Biometrics," which claims benefit under 35 U.S.C. §119 of U.S. Provisional Patent Application No. 61/386,432, filed on Sep. 24, 2010, and entitled "Method and System Using Universal ID and Biometrics" both of which are herein incorporated by reference in their entirety for all purposes.

BACKGROUND

Limited access to financial services presents a problem for emerging markets which seek to empower its residents. For example, some markets may not have convenient access to banks or automatic teller machines (ATMs) for residents to manage their finances. One convention method for accommodating such markets is the use of Micro ATMs which typically support branchless banking and may be located at various non-bank locations. Micro-ATMs may have the capability of reading traditional credit and debit cards as well as other portable consumer devices.

While Micro-ATMs may provide financial services to those that may not otherwise have access to financial institutions, there are some drawbacks. One of the drawbacks is the lack of robust security. There are many opportunities for fraud to occur in Micro ATM systems and conventionally there have not been any highly reliable systems in place to verify the identity of the Micro-ATM user. Embodiments of the invention address these and other problems.

BRIEF SUMMARY

Some regions are implementing identification systems which may provide a process to authenticate area residents. An example of this is a universal identification ("UID"), which may be given to each resident. This identification system may be combined or used in conjunction with traditional payment processing network process flows to inexpensively and effectively use an existing commercial or government system to authenticate a user. The use of the identification system can lower the cost and risk associated with electronic transactions. The identification systems may utilize biometric data, such as finger prints an retina scans to lower the potential of fraud.

A universal ID and biometrics system and methods of operation are disclosed. A method includes receiving, at a payment processing network, an authentication request message originating from a user. The authentication request message may include a first identifier and a second identifier, where the first identifier may be, for example, a Bank Identification Number (BIN) and the second identifier may include biometric data. The method further includes determining a Universal Identification Number (UID) based on the first identifier and sending the biometric data and UID to an identification system to determine if the biometric data and UID have a predetermined correlation. The method further includes receiving confirmation of user authentication if the identification system determines that the second and third identifiers have the predetermined correlation. In a further embodiment, the method includes receiving an authorization request to process a user transaction (e.g., a debit transaction) if authentication is confirmed. These and other embodiments are described in further detail below.

DETAILED DESCRIPTION

Figure 1:
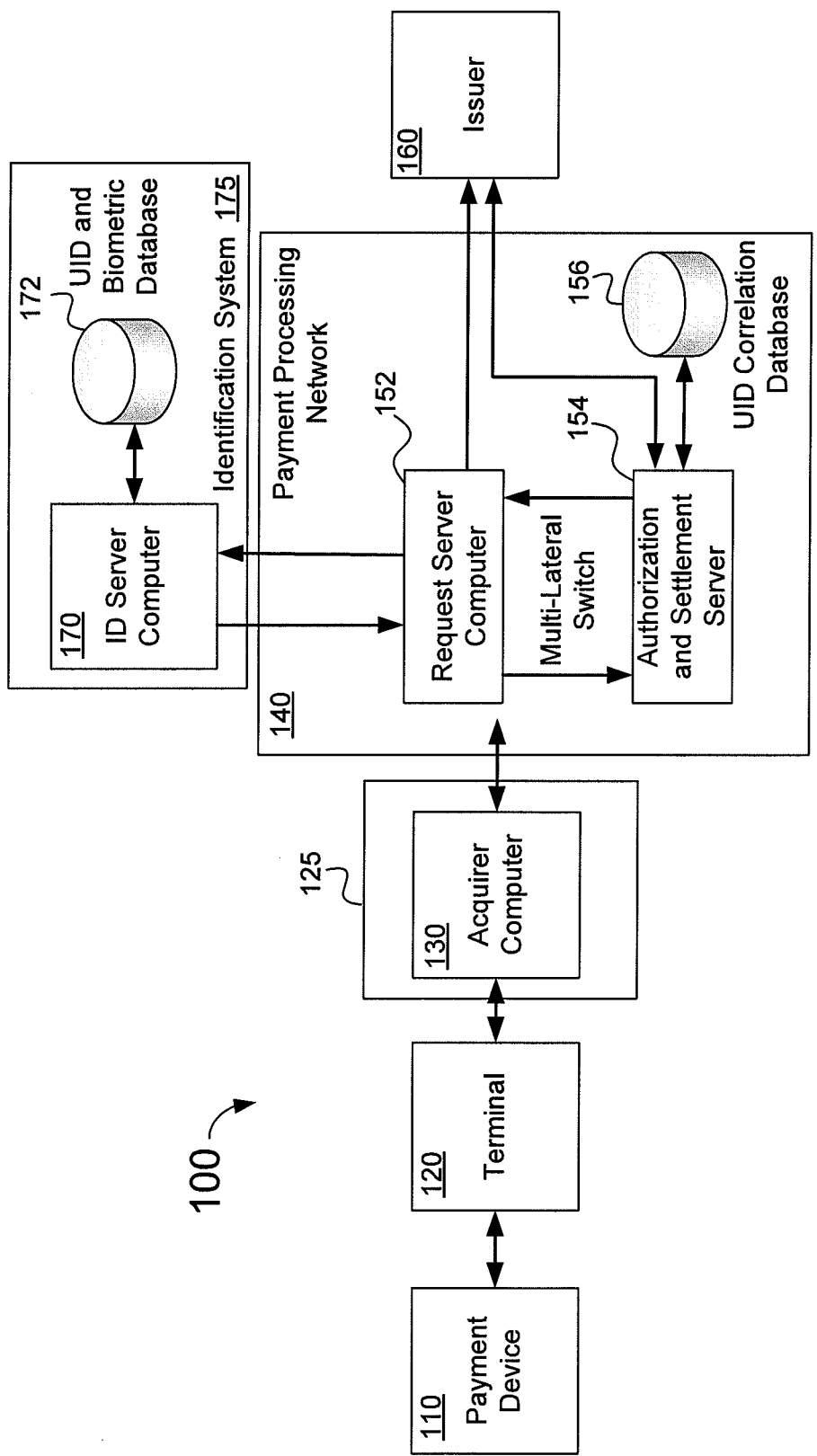
FIG. 1 is a simplified block diagram of a universal ID and biometrics system, according to one embodiment of the present invention.

Embodiments of the invention are generally directed to systems, architectures of the systems, and methods for supporting universal ID and biometrics data.

Some embodiments of the invention are related to both the authorizing and authenticating of a user to complete an account transaction. In certain embodiments, the authorization process may refer to processing a user transaction. For example, a user may swipe a payment device at a terminal (e.g., automatic teller machine or ATM) to perform a financial transaction. In addition, the user inputs biometric data which may include their fingerprint or a retinal scan. An aspect of the authorization process is to determine if the user has enough funds to complete the financial transaction. An aspect of the authentication process is to determine that the user is who they claim to be.

In certain embodiments, a user swipes a payment device at a terminal to access funds from their bank account (transaction request). The terminal prompts the user to input their payment device data (e.g., bank identification number or "BIN") and biometric data (e.g., fingerprint data). The terminal sends the BIN and biometric data, along with the transaction request, to an acquirer (e.g., a bank associated with the terminal). The acquirer in turn sends the BIN, biometric data, and transaction request to a payment processing network (e.g., VisaNet™). In an embodiment, the payment processing network determines a UID for the user based on the BIN. The payment processing network then sends the UID and the biometric data to an identification system to determine if the UID and biometric data match a UID and biometric data stored in a database (i.e., whether the user data and stored data correlate within a certain degree of accuracy). If the data correlates, the user is authenticated and the identification system sends the result to the payment processing network. Once the user is authenticated, the payment processing network sends the transaction request to an issuer (i.e., the bank that issued the user payment device) to process the authorization request. If the user has enough funds to complete the transaction request, the issuer executes the transaction and sends a message to the terminal to deliver the funds to the user. It should be noted that this particular embodiment is but one of many possibilities and permutations of the authentication and authorization process as further detailed below.

Prior to discussing the specific embodiments of the invention, a further description of some terms can be provided for a better understanding of embodiments of the invention.

A "payment device" may include any suitable device capable of making a payment. For example, a payment device can include a card including a credit card, debit card, charge card, gift card, or any combination thereof.

A "payment processing network" (e.g., VisaNet™) A payment processing network may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™ in particular, includes a VIP system (Visa Integrated Payments system) which processes authorization requests and a Base II system which performs clearing and settlement services.

An "authorization request message" can include a request for authorization to conduct an electronic payment transaction. It may further include an issuer account identifier. The issuer account identifier may be a payment card account identifier associated with a payment card. The authorization request message may request that an issuer of the payment card authorize a transaction. An authorization request message according to an embodiment of the invention may comply with ISO 8583, which is a standard for systems that exchange electronic transactions made by cardholders using payment cards.

An "authorization response message" can be a message that includes an authorization code, and may typically be produced by an issuer. A "transaction response" may be an authorization response message in some embodiments of the invention.

An "authentication request message" can be a message that includes a user's identifying information. Typically, an authentication request message is used to perform a security function where a system may determine that a user is who they claim to be based on the user's identifying information. For example, an authentication request message may include a Universal Identification (UID) and user biometric data (e.g., fingerprints). In an embodiment, an identification system will receive the authentication request message and compare the UID and biometric data to a second set of biometric data to determine if there is a match between the two sets of data (i.e., a correlation within a predetermined degree of accuracy).

An "authentication response message" can be a message from an identification system that identifies whether a user is authenticated. Typically, the authentication response message is sent from an identification system to either a payment processing network, an acquirer, or an issuer.

A "server computer" can be a powerful computer or a cluster of computers. For example, the server computer can be a large mainframe, a minicomputer cluster, or a group of servers functioning as a unit. In one example, the server computer may be a database server coupled to a Web server.

A "terminal" (e.g. a point-of-service (POS) terminal) can be any suitable device configured to process payment transactions such as credit card or debit card transactions, or electronic settlement transactions, and may have optical, electrical, or magnetic readers for reading data from other portable consumer devices such as smart cards, keychain device, cell phones, payment cards, security cards, access cards, and the like.

A "Micro-ATM" terminal can be a device that is used by business correspondents (BC's) to deliver basic banking services to users and provide an online, interoperable, low-cost payment platform to serve, in some cases, people in non-traditional locations (e.g., rural areas, regions with little or no commercial development, etc.). In addition, Micro ATMs may support branchless banking and be located at various non-bank locations. In some embodiments, a micro-ATM may engage with a universal ID and biometrics system. Micro-ATMs may have the capability of reading magnetic stripes on traditional credit and debit cards as well as portable consumer devices.

A "business correspondent" or "BC" may have a contractual relationship or obligation with a financial institution or a payment processing network.

An "acquirer" is a business entity (e.g., a commercial bank) that typically has a business relationship with the merchant and receives some or all of the transactions from that merchant.

An "issuer" is a business entity which issues a card to a card holder. Typically, an issuer is a financial institution.

"Biometric data" includes data that can be used to uniquely identify an individual based upon one or more intrinsic physical or behavioral traits. For example, biometric data may include fingerprint data and retinal scan data. Further examples of biometric data include digital photograph data (e.g., facial recognition data), deoxyribonucleic acid (DNA) data, palm print data, hand geometry data, and iris recognition data, A "predetermined correlation," as described herein, can be a relationship between received input data and stored data. In the context of the present invention, the received input data can be a Bank Identification Number (BIN) and biometric data from a user, according to an embodiment. For example, the stored data can be a previously stored UID or BIN and biometric data of the user. The predetermined correlation can be a previously set threshold that identifies or quantifies how much the received input data and the previously stored input data should match. If the received input data and the previously stored input data match according to the predetermined threshold or "correlation", then the data is considered a match. For example, fingerprints contain a certain number of identifying features. If a high number of identifying features of a fingerprint are matched to a stored fingerprint, then the probability that both fingerprints are from the same person may be high. Similarly, if few identifying features match between the two fingerprints, then the probability that they are from the same person is low. Setting the appropriate threshold to ensure an acceptable level of accuracy would be appreciated by one of ordinary skill in the art. One example of a predetermined correlation can be a requirement for a particular number of matching features between two fingerprints. As an illustration, if more than 70% of the features of a stored fingerprint image and a received finger print image match, then the received fingerprint and the stored fingerprint may satisfy a predetermined correlation. If it the number of features of the stored finger print image and the received fingerprint image have less than 70% common features, then the predetermined correlation may not be satisfied. This concept can be applied to other biometric data (e.g., retinal scans). In the context of the present invention, a predetermined correlation can be a matching criterion between one set of a UID and biometric data and a second set of a UID and biometric data, as further described below.

FIG. 1 is a simplified block diagram of a universal ID and biometrics system 100, according to one embodiment of the present invention. The system 100 includes a payment device 110, a terminal 120, an acquirer 125, a payment processing network 140, an issuer 160, and an identification system 175. The acquirer further includes an acquirer computer 130. The payment processing network 140 includes a UID correlation database 156, a request server computer 152 and an authorization and settlement server 154. The identification system 175 includes an identification ("ID") server computer 170 and a universal identification ("UID") and biometric database 172. In some embodiments, the payment processing network 140 is referred to as a multi-lateral switch. In further embodiments, the UID correlation database 156 can be physically located outside of the payment processing network 140 (not shown).

In an embodiment, the payment device 110 is in electronic communication with the terminal 120. The payment device 110 may include a credit card, debit card, charge card, gift card, wire transfer order, travelers cheque, money order, or any combination thereof. In other embodiments, the payment device may be used in conjunction with transactions of currency or points (e.g., points accumulated in a particular software application). Alternatively, the payment device may be a personal digital assistant ("PDA"), mobile cell-phone, or the like. In further embodiments, the payment device may be a wireless device, a contactless device, a magnetic device, or other type of payment device that would be known and appreciated by one of ordinary skill in the art with the benefit of this disclosure. In further embodiments, a payment device 110 is not needed. For example, the BIN or other identifying information can be provided by other means (e.g., a digital wallet).

The terminal 120 is configured to be in electronic communication with the payment device 110 and acquirer computer 130. In one embodiment, the terminal 120 is a Micro-Automated Teller Machine ("ATM"). Micro-ATMs allow customers to perform financial transactions by collecting and using various forms of identification including a user UID, user biometric data, or a Bank Identification Number ("BIN"). The UID, biometric data, BIN, and other identifying data may be referred to as identifiers. In an embodiment, the terminal 120 has the capability of reading a magnetic stripe on a traditional credit/debit card (e.g., BIN), or similar portable consumer devices, such as a mobile phone, as described above.

In some embodiments, a "first identifier" can be any suitable type of account information that can be used to identify an account or a person associated with that account. Examples of first identifiers can include a BIN (Bank Identification Number), a CVV (Card Verification Value), expiration date, phone number, address, etc. Also, in some embodiments, a "second identifier" can include any suitable biometric data. A "third identifier" can include a UID or universal ID, such as a social security number, driver's license number, passport number, etc. In some embodiments, the UID is a unique government issued identification number. Such universal IDs are generally recognized by the government and they can uniquely identify an individual beyond the financial sector. The user biometric data may include fingerprint data, retinal scan data, digital photograph data (e.g., facial recognition data), DNA data, palm print data, hand geometry data, iris recognition data, or other similar biometric identifier that would be appreciated by one of ordinary skill in the art with the benefit of this disclosure.

In an embodiment, the micro-ATMs are deployed by banks either directly, or through service providers. In another embodiment, the micro-ATM terminal 120 may be operated by an individual, or business correspondent ("BC"). A BC may have a contractual relationship or obligation with the payment processing network 140 (e.g., VisaNet™) or may be appointed by the bank to provide access to banking services using the micro-ATM including, but not limited to, taking deposits, dispensing cash for withdrawals, processing funds transfers, and answering balance inquiries. In an embodiment, the micro-ATM terminal 120 is configured to transfer the UID, BIN, biometric data, etc., to the acquirer computer 130 for further processing.

The acquirer computer 130 is one component of acquirer 125 (i.e., an acquirer bank), according to an embodiment of the invention. The acquirer 125 is an entity with which the BC has a contractual relationship. The acquirer 125 can act as a biometrics analysis entity. The acquirer computer 130 can be configured to transfer the identification (e.g., UID, BIN, biometric data, etc.) and financial information to the payment processing network 140. In some embodiments, the acquirer 125 does not need to be present in the universal ID and biometrics system 100 to transfer the financial and user identification data to the payment processing network 140. In further embodiments, the acquirer computer 130 is configured to transfer financial and user identification data directly to the ID server computer 170, as further discussed below in conjunction with FIG. 2B. In one non-limiting example, the acquiring bank 125 may additionally check the credentials of the user against a watch list in order to prevent fraud and money laundering schemes, as would be appreciated by one of ordinary skill in the art.

The various components of the payment processing network 140 are configured to correlate the BIN to a UID number, transfer the UID number and biometric data ("authentication data") to the ID server computer 170 to authenticate the user, communicate with the issuer 160 to effectuate or "authorize" a transaction, and communicate authorization and authentication results back to the user on the terminal 120, depending on the type and timing of the transaction. In one embodiment, the payment processing network 140 is VisaNet™, where Visa internal processing (VIP) performs the various payment processing network 140 or multi-lateral switch functions described herein.

In one embodiment, the authorization and settlement server ("authorization server") 154 performs the payment authorization functions as will be discussed in conjunction with FIG. 2B. The authorization server 154 is further configured to determine a user's UID based on the BIN entered at the terminal 120. The authorization server queries the UID correlation database 156 to return the UID associated with the user's BIN. In an embodiment, the UID correlation database 156 is configured to map a user payment device to a UID. The UID correlation database 156 may be located within the payment processing network 140. In another embodiment, the UID correlation database 156 is located within a cloud server (not shown). The authorization server 154 is further configured to send and receive authorization data to the issuer 160.

In an embodiment, the request server computer 152 is configured to query the ID server computer 170 to authenticate a user based on the user's UID number and biometric data (authentication data). The request server computer 152 may be configured to format the authentication request in a variety of communication protocols. For example, the request and response message (authentication request) may be in Extensible Markup Language (XML), Hypertext Transfer Protocol Secure (HTTPS), or other transfer protocol known by those skilled in the art. Alternatively, the request server computer 152 may be a UID web service proxy computer. Furthermore, the authentication data may include demographic information or other user identifying information that would be known and appreciated by one of ordinary skill in the art.

The ID server computer 170 of the identification system 175 is configured to receive and compare the UID and biometric data from the payment processing network 140 with the user UID and biometric data stored in the UID and biometric database 172 to determine if there is a match. The ID server computer 170 can be managed by an independent entity separate from the payment processing network 140. In an embodiment, the identification system 175 is managed by a governmental entity wherein the UID number is issued by the governmental entity. The governmental entity can register a user with the identification system 175 prior to the transaction to capture identifying information, such as the biometric data. One advantage of using an independent entity (e.g., governmental entity) to verify a user's identity is to provide greater security to both the user and issuer 160 thereby reducing instances of fraud. In some embodiments, the ID server computer 170 can receive the user authentication data (UID and biometric data) directly from the terminal 120, the acquirer 125, and the issuer 160. The UID and biometric database 172 is located within the identification system 175. In another embodiment, the UID and biometric database 172 is located within a cloud server (not shown). In certain embodiments, a user's social security number (SSN) can be used instead of, or in combination with, the UID. In addition, it should be understood that the various embodiments described herein can be modified to include a user's SSN as a user identifier. In one embodiment, the issuer 160 is configured to receive the authorization data from the authorization server 154. The issuer 160 receives authentication data from the request server computer 152 and determines if the user is authorized to perform a given financial transaction (e.g., cash deposit/withdrawal, money transfer, balance inquiry) based on whether the user was authenticated by the identification system 175. If the identification system 175 authenticates the user (i.e. the UID and biometric data match with the user), the issuer 160 authorizes the financial transaction. In other embodiments, the issuer 160 may consider other factors in addition to the authentication in determining whether to authorize the financial transaction. For example, a user's geographic location, a transaction amount, transaction history, or other metrics may be used as would be appreciated by one of ordinary skill in the art with the benefit of this disclosure. In another embodiment, the identification system 175 can consider the various other factors described above (e.g., geographic location, transaction amount, transaction history, etc.) in determining if the user is authenticated.

To illustrate one embodiment of the operation of system 100, a payment processing network 140 can receive an authentication request message originating from a user, the authentication request message including a first identifier (e.g., a BIN) and a biometric identifier. The payment processing network 140 can be configured to determine a third identifier (e.g., a UID) based on the first identifier. The payment processing network 140 is configured to send the second and third identifiers to a first server computer 170 of an identification system 175 to determine if the second and third identifiers have a predetermined correlation. The payment processing network 140 is further configured to receive confirmation from the first server 170 that the user is authenticated if the identification system determines that the second and third identifiers have the predetermined correlation.

To illustrate an aspect of the identification system 175, certain embodiments can perform a method including storing a first identifier and a first set of biometric data in a database and receiving an authentication request message from a first server, where the authentication request message includes a second identifier and a second set of biometric data. The method further includes determining whether the second identifier and second set of biometric data matches the first identifier and the first set of biometric data according to a predetermined threshold and generates an authentication response message indicating whether the first and second set of biometric data match according to the predetermined threshold. In further embodiments, the identification system 175 sends the authentication response message to the first server.

Figures 2A, 2B:
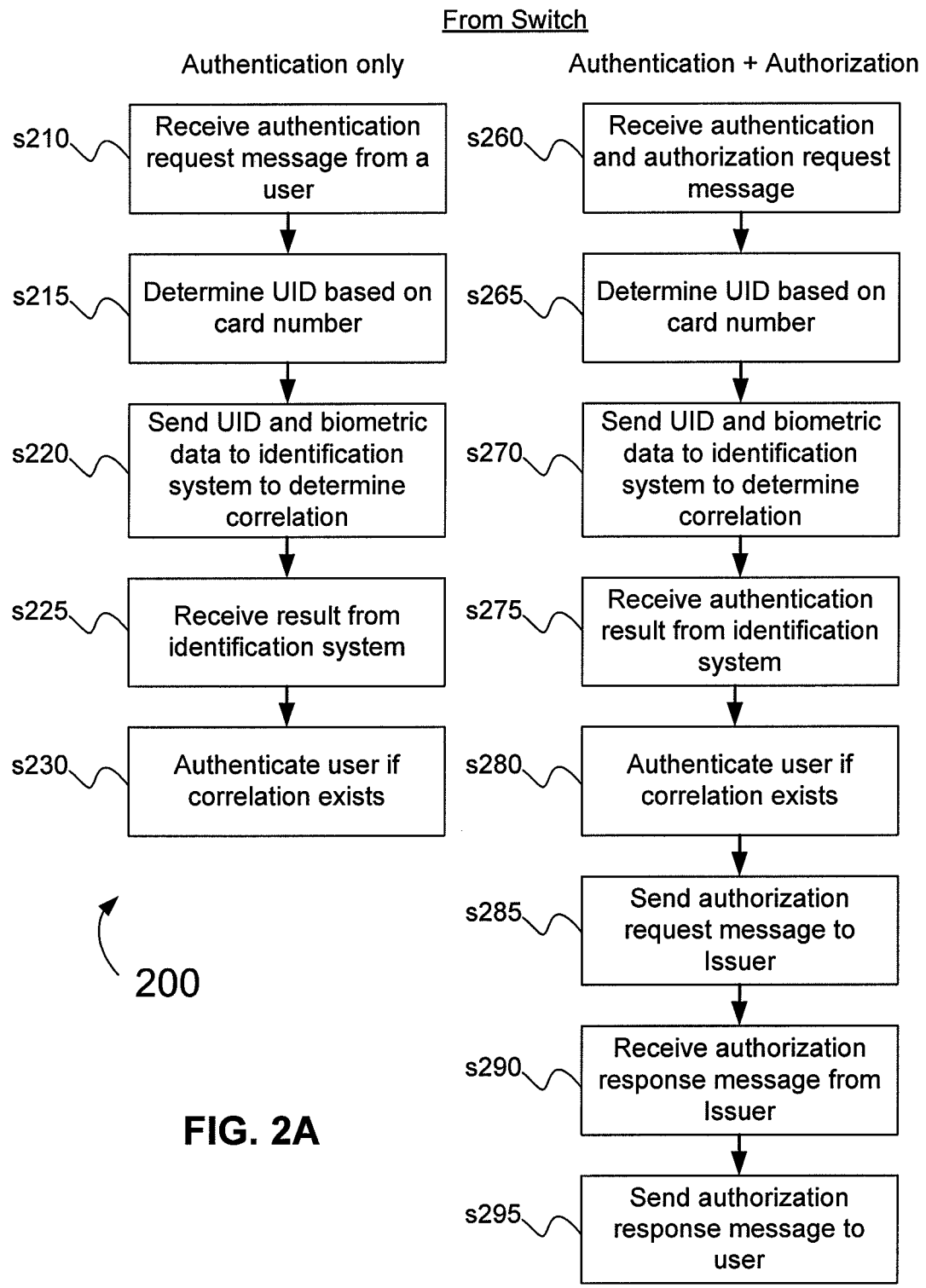
FIG. 2A is a simplified flow diagram illustrating a method for authenticating a user, according to an embodiment of the present invention.
FIG. 2B is a simplified flow diagram illustrating a method for authenticating and authorizing a user for a financial transaction according to an embodiment of the present invention.

FIG. 2A is a simplified flow diagram illustrating a method 200 for authenticating a user according to an embodiment of the present invention. The method 200 is performed by processing logic that may comprise hardware (circuitry, dedicated logic, etc.), software (such as is run on a general purpose computing system or a dedicated machine), firmware (embedded software), or any combination thereof. In one embodiment, the method 200 is performed by the request server computer 152 of FIG. 1. In another embodiment, the method 200 is performed by the payment processing network 140 and the various components therein.

Referring to FIG. 2A, the method 200 includes the request server computer 152 receiving an authentication request message from a user by way of the terminal 120 and the acquirer computer 130 (s210). According to an embodiment, the authentication request message includes the user bank card number (or other account identifier) and biometric data (e.g., fingerprint data, retina scan data, etc.). In other embodiments, the authentication request message may include demographic data, geographic data, or other data relevant to authenticating a user as would be appreciated by one of ordinary skill in the art with the benefit of this disclosure.

At step s215, the request server computer 152 determines the user's UID by querying the UID correlation database 156 to return a UID associated with the user's bank card or BIN. Once the user's UID is determined, the request server computer 152 sends an authentication request message including the user UID and biometric data to the ID server computer 170 to determine if there is a predetermined correlation (s220) between the UID, biometric data, and the user. The ID server computer 170 performs the correlation by comparing the user data (UID and biometric data) with the data in the UID and biometric database 172. The UID and biometric database 172 typically has a preexisting database comprising UID and biometric information for the intended users of system 100. The request server computer 152 receives the result (i.e., the authentication response message) from the ID server computer 170 of the identification system 175 (s225), and authenticates the user if a predetermined correlation between the UID and biometric data exists (s230). In some embodiments, the payment processing network 140 may have other server computers and systems that send authentication requests to the identification system 175. In further embodiments, the request server computer 152 may consider other factors in addition to the authentication result received from the identification system 175 to determine if the user is authenticated, as described above. In some embodiments, the BIN or user credit card may be referred to as a first identifier, the biometric data may be referred to as a second identifier, and the UID may be referred to as a third identifier.

It should be appreciated that the specific steps illustrated in FIG. 2A provides a particular method of authenticating a user in a system 100, according to an embodiment of the present invention. Other sequences of steps may also be performed according to alternative embodiments. For example, alternative embodiments of the present invention may perform the steps outlined above in a different order. Moreover, the individual steps illustrated in FIG. 2A may include multiple substeps that may be performed in various sequences as appropriate to the individual step. Furthermore, additional steps may be added or removed depending on the particular applications. One of ordinary skill in the art would recognize and appreciate many variations, modifications, and alternatives of the method 200.

FIG. 2B is a simplified flow diagram illustrating a method 250 for authenticating and authorizing a user for a financial transaction according to an embodiment of the present invention. The method 250 is performed by processing logic that may comprise hardware (circuitry, dedicated logic, etc.), software (such as is run on a general purpose computing system or a dedicated machine), firmware (embedded software), or any combination thereof. In one embodiment, the method 250 is performed by the request server computer 152 of FIG. 1. In another embodiment, the method 250 is performed by the payment processing network 140 and the various components therein.

Referring to FIG. 2B, the method 250 includes the request server computer 152 receiving an authentication request message and an authorization request message from a user by way of the terminal 120 and acquirer computer 130 (s260). The authentication request message includes the user bank card number and biometric data (e.g., fingerprint data, retina scan data, etc.). In other embodiments, the authentication request message may include demographic data, geographic data, or other data relevant to authenticating a user as would be appreciated by one of ordinary skill in the art with the benefit of this disclosure. In an alternative embodiment, the system 100 does not have an acquirer 125 or acquirer computer 130.

At step s265, the request server computer 152 determines the user's UID by querying the UID correlation database 156 to return a UID associated with the user's bank card or BIN. Once the user's UID is determined, the request server computer 152 sends an authentication request including the user UID and biometric data to the ID server computer 170 to determine if there is a predetermined correlation (s270) between the UID, biometric data, and the user. The ID server computer 170 performs the correlation by comparing the user data (UID and biometric data) with the data in the UID and biometric database 172. The request server computer 152 receives the result (i.e., the authentication response message) from the ID server computer 170 of the identification system 175 (s275), and authenticates the user if a correlation between the UID and biometric data exists (s280). In some embodiments, the payment processing network 140 may have other servers and systems that send authentication requests to the identification system 175. In further embodiments, the request server computer 152 may consider other factors in addition to the authentication result received from the identification system 175 to determine if the user is authenticated, as described above. In an embodiment, the user BIN, credit card number, biometric data, and the like may be referred to as identifiers. In one non-limiting example, a user credit card number is a first identifier, the biometric data is a second identifier, and the UID is a third identifier.

At step s285, payment processing network 140 requests authorization for the transaction from the issuer 160. In some embodiments, the authorization request message may originate from the request server computer 152, the authorization and settlement server 154, or other server or system within the payment processing network 140. As described above, the authorization request message may include financial transaction data. In one embodiment, the authentication request message is in the form of an authorization request message. In other words, the user sends an authorization request message that includes authentication information encoded therein (i.e., the authentication data is embedded within the authorization request message). For example, the authorization request message can include transaction data, such as information derived from a payment device (e.g., an account identifier), terminal data, the transaction amount, as well as the authentication data which can be added therein. According to some embodiments, the authentication data (e.g., BIN and biometric data) is stored in one or more arrays or data fields within the authorization request message. In other embodiments, the authentication data can be prepended or appended to the authorization request message. Furthermore, the authentication data can be encrypted dynamically or encryption can be added by intervening systems (e.g., the acquirer). In certain embodiments, the payment processing network 140 extracts the authentication request message from the authorization request message and sends the authentication information (e.g., UID and biometric data) to the ID server computer 170 as described above.

At step s290, the payment processing network 140 receives an authorization response from the issuer 160. In an embodiment, the payment processing network 140 receives a negative authorization response if the issuer 160 determines that the user is not authenticated, as described above with respect to steps s270-s275. In some embodiments, a user may not be authenticated if the user's UID and biometric data are not correlated. In other embodiments, other criteria may be considered in determining whether a user is authenticated in addition to the user UID and biometric data, such as geographic information, account balance, account history, and other parameters that would be known and appreciated by one of ordinary skill in the art with the benefit of this disclosure. In further embodiments, the payment processing network 140 receives a positive authorization response if the user is authenticated and is cleared for the particular financial transaction. For example, if a user attempts to withdraw a hundred dollars from an account with a balance of ten dollars, authorization will fail despite a valid authentication.

At step s295, the payment processing network 140 sends the authorization result to the user. In an embodiment, the system 100 requires authorization at the terminal 120 before processing a user-initiated transaction (e.g., a financial transaction). In other embodiments, the system 100 may process a financial transaction once the payment processing network 140 receives both positive authentication and authorization information. In a further embodiment, the system 100 processes a financial transaction once the issuer 160 receives both positive authentication and authorization information.

It should be appreciated that the specific steps illustrated in FIG. 2B provides a particular method of authenticating a user in a system 100, according to an embodiment of the present invention. Other sequences of steps may also be performed according to alternative embodiments. For example, alternative embodiments of the present invention may perform the steps outlined above in a different order. Moreover, the individual steps illustrated in FIG. 2B may include multiple substeps that may be performed in various sequences as appropriate to the individual step. Furthermore, additional steps may be added or removed depending on the particular applications. One of ordinary skill in the art would recognize and appreciate many variations, modifications, and alternatives of the method 250.

Figure 3:
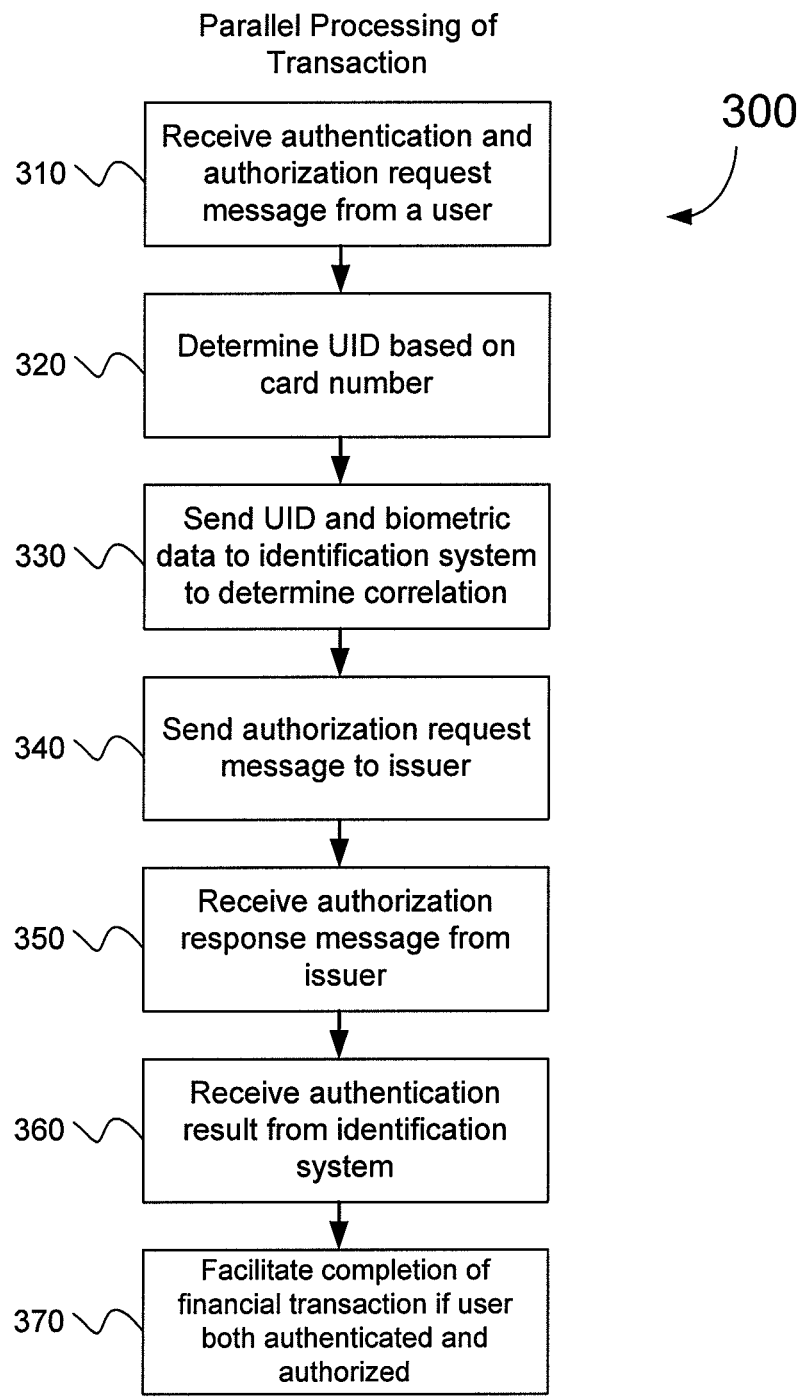
FIG. 3 is a simplified flow diagram illustrating a method 300 for contemporaneously authenticating and authorizing a user for a financial transaction, according to an embodiment of the present invention.

FIG. 3 is a simplified flow diagram illustrating a method 300 for contemporaneously authenticating and authorizing a user for a financial transaction, according to an embodiment of the present invention. The method 300 is performed by processing logic that may comprise hardware (circuitry, dedicated logic, etc.), software (such as is run on a general purpose computing system or a dedicated machine), firmware (embedded software), or any combination thereof. In one embodiment, the method 300 is performed by the request server computer 152 of FIG. 1. In another embodiment, the method 300 is performed by the payment processing network 140 and the various components therein.

Referring to FIG. 3, the method 300 includes the request server computer 152 receiving an authentication request message and an authorization request message from a user by way of the terminal 120 and acquirer computer 130 of terminal 125 (s310). The authentication request message includes the user bank card number and biometric data (e.g., fingerprint data, retina scan data, etc.). In other embodiments, the authentication request message may include demographic data, geographic data, or other data relevant to authenticating a user as would be appreciated by one of ordinary skill in the art with the benefit of this disclosure. In an alternative embodiment, the system 100 does not have an acquirer 125 or acquirer computer 130.

At step s320, the request server computer 152 determines the user's UID by querying the UID correlation database 156 to return a UID associated with the user's bank card or BIN. Once the user's UID is determined, the request server computer 152 sends an authentication request including the user UID and biometric data to the ID server computer 170 to determine if there is a predetermined correlation (s330) between the UID, biometric data, and the user, as described above with respect to FIG. 2B.

At step s340, payment processing network 140 continues the process of requesting authorization of the transaction and forwards the authorization request message to the issuer 160. In some embodiments, the authorization request may originate from the terminal 120, as well as the request server computer 152, the authorization and settlement server 154, or other server or system within the payment processing network 140. In one embodiment, the authorization request and the authentication request messages are sent or submitted by the payment processing network 140 contemporaneously. Instead of waiting for the authentication response message from the identification system 175 before sending the authorization request message to the issuer 160, the payment processing network 140 can send both request messages to the identification system 175 and the issuer 160 in parallel in the interest of reducing the overall transaction time. The payment processing network 140 can receive response messages from both the identification system 175 and the issuer 160. The issuer 160 can generate a single authorization response message that is sent to the terminal 120 via the acquirer computer 125. The authorization response message may comprise both an indication of whether or not the transaction is authorized, and may also optionally contain the result of the authentication process.

Illustratively, in one embodiment, the identification system 175 may perform the various authentication functions relatively slowly in comparison to the authorization process, thus becoming a "bottleneck" in the overall transaction. To help mitigate the longer delay associated with the authentication process, the payment processing network 140 sends the authorization request message to the issuer 160 before receiving an authentication response message with the authentication result from the identification system 175. As a result, the authorization and authentication request messages are processed in parallel. In other words, the payment processing network 140 sends the financial transaction data (i.e., the authorization request) to the issuer 160 at substantially the same time (i.e., contemporaneously) that the UID and biometric data are sent to the identification system 175 for authentication. In an alternative embodiment, the authentication request is sent to the identification system 175 before the authorization request is sent to the issuer 160. In another embodiment, the authorization request is sent to the issuer 160 before the authentication request is sent to the identification system 175.

At step s350, the payment processing network 140 receives the authorization response message including the authorization result from the issuer 160. In some embodiments, the payment processing network 140 may receive the authorization response message including the authorization result from the issuer 160 before receiving the authentication response message with the authentication result from the identification system 175 (step s360). In other embodiments, the payment processing network 140 may receive the authorization response message with the authorization result from the issuer 160 after receiving the authentication response message with the authentication result.

At step s370, the payment processing network 140 completes the financial transaction if the user is both authenticated by the identification system 175 and the transaction is authorized by the issuer 160. In alternative embodiments, other components (i.e., the acquirer 125, the terminal 120, and the issuer 160) in the system 100 may send the authentication data to the identification system 175 instead of the payment processing network 140. Similarly, the other components may process the authorization and authentication requests in parallel, as described above, and all the various permutations described herein.

It should be appreciated that the specific steps illustrated in FIG. 3 provides a particular method of authenticating a user in a system 100, according to an embodiment of the present invention. Other sequences of steps may also be performed according to alternative embodiments. For example, alternative embodiments of the present invention may perform the steps outlined above in a different order. Moreover, the individual steps illustrated in FIG. 3 may include multiple substeps that may be performed in various sequences as appropriate to the individual step. Furthermore, additional steps may be added or removed depending on the particular applications. One of ordinary skill in the art would recognize and appreciate many variations, modifications, and alternatives of the method 300.

Figure 4A:
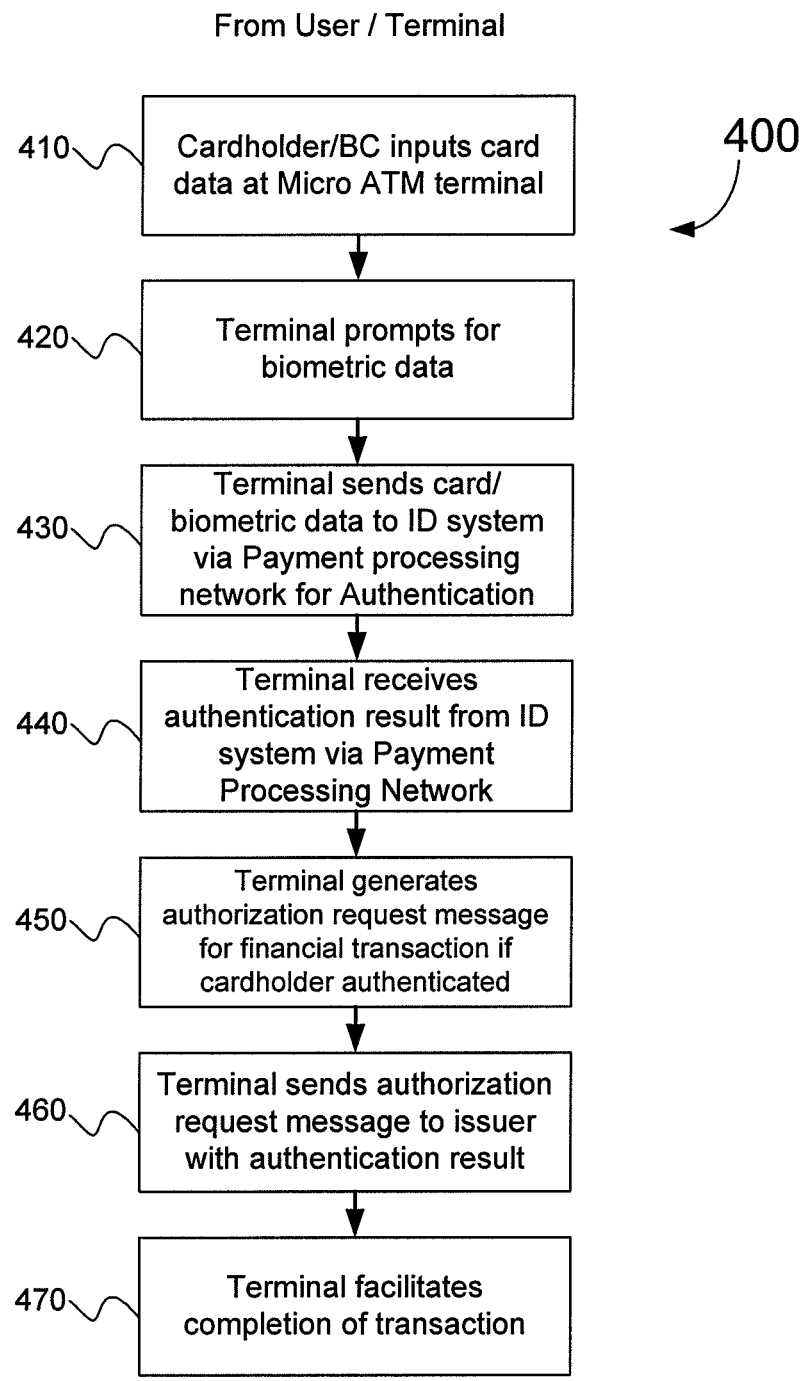
FIG. 4A is a simplified flow diagram illustrating a method 400 for authenticating and authorizing a user for a financial transaction according to an embodiment of the present invention.

FIG. 4A is a simplified flow diagram illustrating a method 400 for authenticating a user and authorizing a transaction according to an embodiment of the present invention. The method 400 is performed by processing logic that may comprise hardware (circuitry, dedicated logic, etc.), software (such as is run on a general purpose computing system or a dedicated machine), firmware (embedded software), or any combination thereof. In one embodiment, the method 400 is performed by the terminal 120 of FIG. 1.

Referring to FIG. 4A, the method 400 includes the user (i.e., the cardholder) inputting payment device 110 data (e.g., bank card, debt card, etc.) at a terminal 120. The terminal (step s410) collects user identifying information including bank card data, user data, and the like. In some embodiments, the terminal 120 may be a Micro-ATM terminal, a BC (Business Correspondent), and the like, as described above with respect to FIG. 1. At step s420, the terminal 120 prompts the user for biometric data. The user proceeds to enter the biometric data which may include finger print data, retinal scan data, or other biometric data as would be known and appreciated by one of ordinary skill in the art with the benefit of this disclosure. The terminal 120 is discussed in further detail below with respect to FIG. 5.

At step s430, the terminal 120 sends the payment data (e.g., BIN) and the biometric data to the identification system 175 by way of the payment processing network 140 to authenticate the user. The payment data and the biometric data may be sent to the identification system 175 in an authorization request message, or alternatively in an authentication request message. Once the payment processing network 140 receives the payment data and the biometric data, the payment processing network 140 determines the user UID based on the payment data (i.e., BIN, etc.) and subsequently sends the UID and biometric data to the identification system 175, as described above with respect to FIG. 2A. In some embodiments, the identification system 175 receives the UID and biometric data from other components of system 100 other than the payment processing network 140 including, but not limited to, the terminal 120, the acquirer 125, and the issuer 160.

At step s440, the terminal 120 receives an authentication response message comprising the authentication result from the identification system 175 by way of the payment processing network 140. According to some embodiments, the terminal 120 may receive the authentication result from the acquirer 125, the issuer 160, or directly from the identification system 175, as described above.

At step s450, the terminal 120 generates an authorization request message for a transaction if the user (i.e., payment device holder) is authenticated. In one embodiment, the transaction is a financial transaction. In other embodiments, the transaction may generally relate to data acquisition. At step s460, the terminal 120 sends (e.g., transmits) the authorization request message to the issuer 160 and encodes the authentication result in the same transmission. For example, if the authentication result is positive and the user is authenticated, then a flag such as "1" may be present in the authorization request message. If the authentication result is negative, then a flag such as "0" may suggest that the user was not authenticated. In yet other embodiments, an authentication "score" may be provided (e.g., a scale of 1-10, with 1 being unauthenticated and 10 being completely authenticated) in the authorization request message indicating a degree of authentication. A degree of authentication may exist when received biometric data somewhat matches, but does not fully match stored biometric data. In other embodiments, the authentication result may be sent to the issuer 160 earlier or later than the authorization request.

At step 470, the transaction can be completed at the terminal 120. If the issuer 160 authorizes the transaction, then the user-initiated transaction is completed. If the issuer 160 does not authorize the transaction, then the terminal 120 can provide the authorization response message rejecting the transaction to the user. Similarly, if the identification system 175 does not authenticate the user, an authentication response message with the authentication result may be sent to the terminal 120 and the terminal 120 can provide the authentication result for the user, thus completing the transaction. Other protocols may be used to respond to the rejection of the authentication or authorization request and would be known by one of ordinary skill in the art.

It should be appreciated that the specific steps illustrated in FIG. 4A provides a particular method of authenticating a user in a system 100, according to an embodiment of the present invention. Other sequences of steps may also be performed according to alternative embodiments. For example, alternative embodiments of the present invention may perform the steps outlined above in a different order. Moreover, the individual steps illustrated in FIG. 4A may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 400.

Figure 4B:
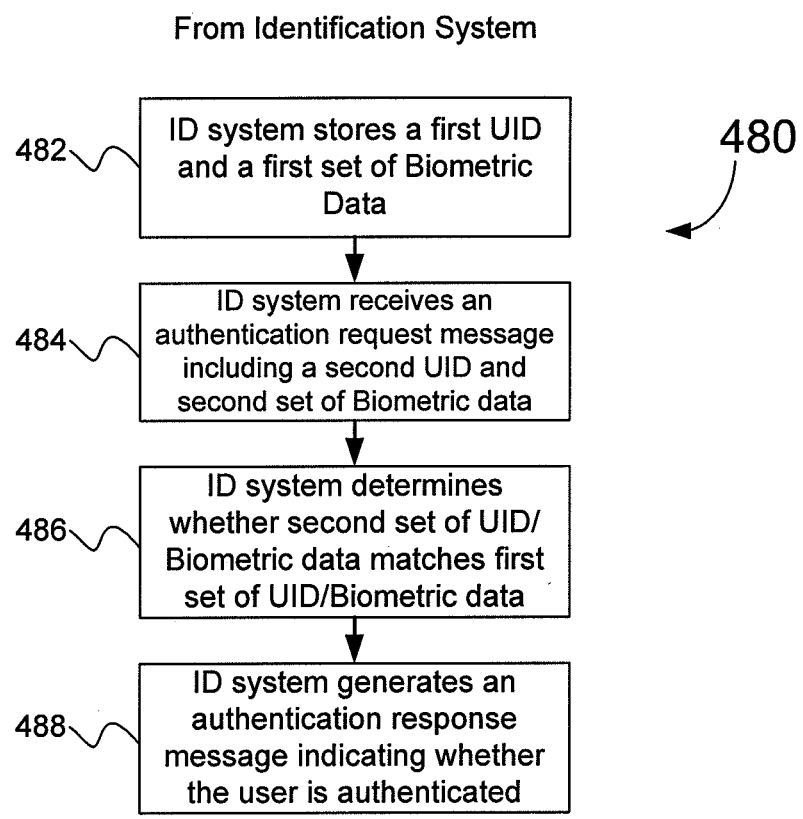
FIG. 4B is a simplified flow diagram illustrating a method 480 for authenticating a user according to an embodiment of the present invention.

FIG. 4B is a simplified flow diagram illustrating a method 480 for authenticating a user according to an embodiment of the present invention. The method 480 is performed by processing logic that may comprise hardware (circuitry, dedicated logic, etc.), software (such as is run on a general purpose computing system or a dedicated machine), firmware (embedded software), or any combination thereof. In one embodiment, the method 480 is performed by the terminal 120 of FIG. 1.

Referring to FIG. 4B, the method 480 includes storing a first UID and a first set of biometric data in the UID and biometric database 172 of identification system 175 (step s482). In an embodiment, the identification system 175 is managed by a governmental entity. In certain embodiments, the governmental entity can register a user with the identification system 175 prior to receiving an authentication request message. In some embodiments, the registering process can further include storing a user's name, address, phone number, or other geographic or demographic information in addition to the UID and biometric data discussed above. The UID and biometric database 172 can be located within the identification system 175. In other embodiments, the UID and biometric database 172 can be located external to the identification system 175. For example, the UID and biometric database 175 can be located in a cloud server (not shown). As described above, the first set of biometric data may include fingerprint data, retinal scan data, digital photograph data (e.g., facial recognition data), deoxyribonucleic acid (DNA) data, palm print data, hand geometry data, iris recognition data, or other types of biometric data that would be known by one of ordinary skill in the art.

At step s484, the identification system 175 receives an authentication request message that includes a second UID and a second set of biometric data. In some embodiments, the authentication request message is sent by a payment processing network 140. In some embodiments, the identification system 175 receives the second UID and second set of biometric data from other components of system 100 including, but not limited to, the terminal 120, the acquirer 125, and the issuer 160.

At step s486, the identification system 175 determines whether the second UID and the second set of biometric data matches the first UID and first set of biometric data according to a predetermined threshold. The predetermined threshold can be a previously set threshold value that identifies or quantifies how much the received input data (i.e., the second UID and second set of biometric data) and the previously stored input data (i.e., the first UID and first set of biometric data) should match. If the received input data and the previously stored input data match or correlate according to the predetermined threshold, then the data is considered a match. The identification system 175 can optionally consider secondary factors in the authentication process. For example, the identification system 175 can consider a user's name, address, phone number, geographic location, or other demographic information that can help determine if the user is who they claim to be. To illustrate, if the UID and biometric data marginally correlate and a user is remotely located from their home address or inputs incorrect demographic data, the identification system 175 can factor this into the decision to authenticate the user.

At step s488, the identification system 175 generates an authentication response message indicating whether the user is authenticated. For example, if the second UID and second set of biometric data correlate with the first UID and first set of biometric data according to the predetermined threshold, the identification system 175 generates a authentication response message indicating that the user is authenticated. On the other hand, if the first a second sets of UID and biometric data do not match according to the predetermined threshold, the identification system 175 generates a message indicating that the user is not authenticated. According to some embodiments, the manner in which the identification system 175 reports user authentication can be graded. For example, the identification system 175 can generate an authentication response message indicating that the UID and biometric data strongly correlates (e.g., 90% match) or marginally correlates (e.g., 60% match). Defining what would constitute a strong or marginal correlation would be known by one of ordinary skill in the art with the benefit of this disclosure.

It should be appreciated that the specific steps illustrated in FIG. 4B provides a particular method of authenticating a user in a system 100, according to an embodiment of the present invention. Other sequences of steps may also be performed according to alternative embodiments. For example, alternative embodiments of the present invention may perform the steps outlined above in a different order. Moreover, the individual steps illustrated in FIG. 4B may include multiple substeps that may be performed in various sequences as appropriate to the individual step. Furthermore, additional steps may be added or removed depending on the particular applications. One of ordinary skill in the art would recognize and appreciate many variations, modifications, and alternatives of the method 480.

Figure 5:
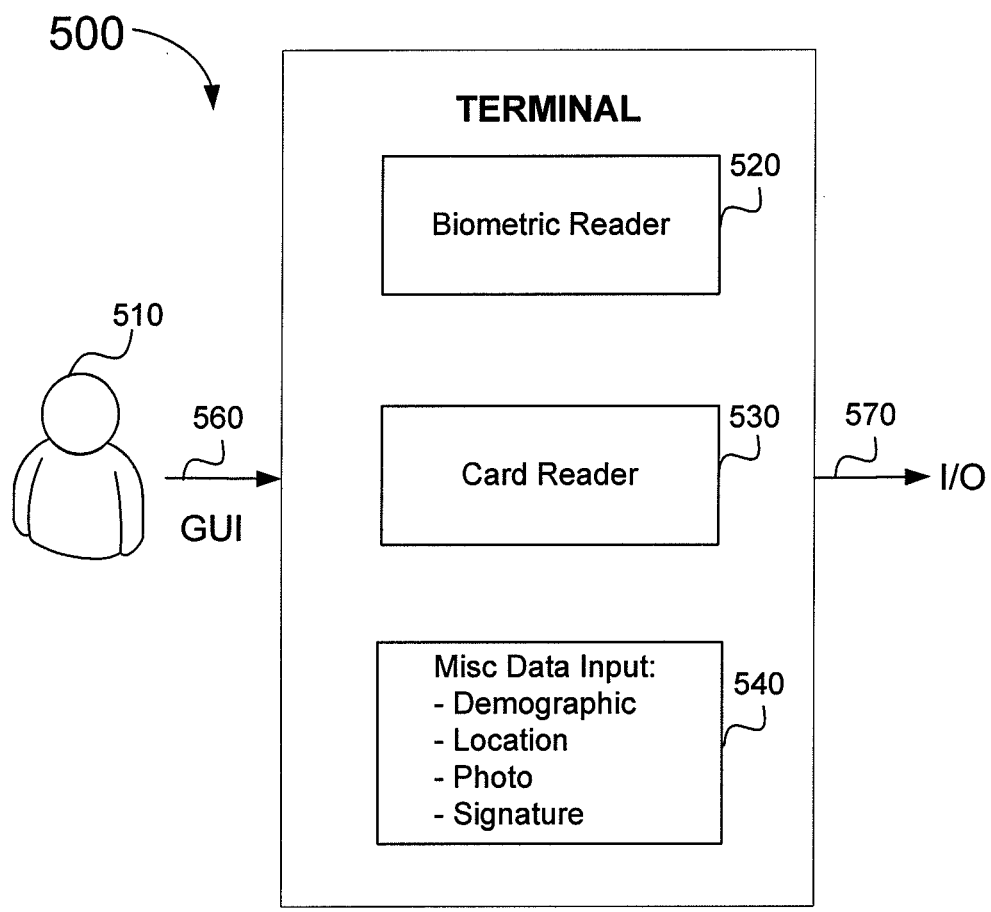
FIG. 5 is a simplified block diagram of a terminal 120, according to one embodiment of the present invention.

FIG. 5 is a simplified block diagram of a terminal 500, according to one embodiment of the present invention. The terminal 500 includes a user 510, biometric reader 520, a card reader 530, a data input 540, a user input 560, and an input/output port ("I/O") 570. In one embodiment, the terminal 500 is a micro-ATM terminal, configured for operation by a BC. In another embodiment, the terminal 500 is the terminal 120 of FIG. 1.

In an embodiment, the user input 560 is a user interface configured to allow the user to input a payment device and/or enter biometric data. The user input 560 is a GUI ("graphical user interface"). In other embodiments, a BC may collect the biometric information, card information, or other miscellaneous identifying data. The payment device may be a bank card, debit card, rewards card, or the like. The biometric reader 520 is configured to receive the biometric data from the user including finger print data, retinal scan data, or other biometric data uniquely identifying the user. The card reader 530 is configured to receive data from the user payment device. In one embodiment, the card reader 530 is configured to read a magnetic stripe. Alternatively, the card reader 530 may be configured to read contactless payment devices. In one non-limiting example, the card reader 530 reads a service code in a track (e.g., from a magnetic stripe) and prompts for user biometric data. Other embodiments may optionally allow a user or BC to manually input payment device data. The data input 540 is configured to receive other various user identification data including user demographic information, user location, a user signature, a user photograph, or other identifying information known and appreciated by one of ordinary skill in the art. The I/O port 570 is configured to send and receive data to and from the terminal 120. For example, the I/O port 570 may transfer a user's BIN and biometric data from the card reader 530 and biometric reader 520, respectively, to an acquiring financial institution (e.g., acquiring computer 130) or payment processing network (not shown) to perform an authentication and/or authorization request. In one embodiment, the terminal 500 is configured to receive UID data.

Figure 6:
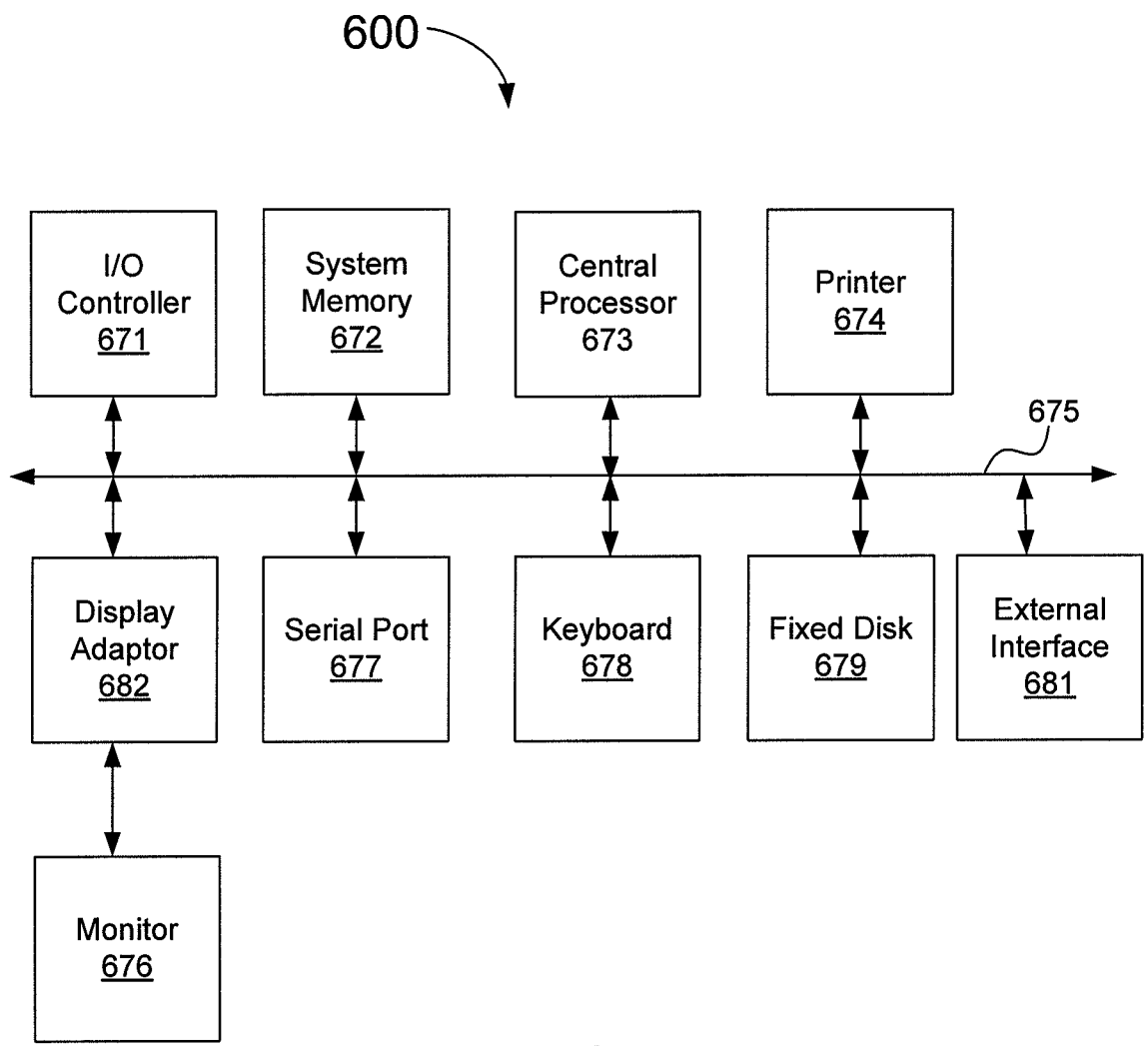
FIG. 6 is a diagram of a computer apparatus, according to an example embodiment.

FIG. 6 is a diagram of a computer apparatus 600, according to an example embodiment. The various participants and elements in the previously described system diagrams (e.g., the payment processing network, multilateral switch, acquiring bank, issuing bank, identification system 175, etc. in FIGS. 1-5) may use any suitable number of subsystems in the computer apparatus to facilitate the functions described herein. Examples of such subsystems or components are shown in FIG. 6. The subsystems shown in FIG. 6 are interconnected via a system bus 675. Additional subsystems such as a printer 674, keyboard 678, fixed disk 679 (or other memory comprising computer-readable media), monitor 676, which is coupled to display adapter 682, and others are shown. Peripherals and input/output (I/O) devices (not shown), which couple to I/O controller 671, can be connected to the computer system by any number of means known in the art, such as serial port 677. For example, serial port 677 or external interface 681 can be used to connect the computer apparatus to a wide area network such as the Internet, a mouse input device, or a scanner. The interconnection via system bus allows the central processor 673 to communicate with each subsystem and to control the execution of instructions from system memory 672 or the fixed disk 679, as well as the exchange of information between subsystems. The system memory 672 and/or the fixed disk 679 may embody a computer-readable medium.

The software components or functions described in this application may be implemented as software code to be executed by one or more processors using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

In some embodiments, system 100 comprises a multi-lateral switch configured to be directly or indirectly coupled to a user, the multi-lateral switch configured to receive an authentication request message originating from the user and an authorization request message originating from the user. In certain embodiments, the authentication request message includes a card identification number and biometric data, wherein the multi-lateral switch is configured to determine a user-specific identification number based on the card identification number.

Another embodiment may be directed to a method comprising generating an authentication request message including a first identifier and a second identifier, the second identifier being a biometric identifier. The server computer can be configured to send an authentication request message to a payment processing network. The server computer receives confirmation from the payment processing network that an independent identification system authenticated the user if the identification system determines that the biometric identifier and a third identifier provided by the payment processing network have a predetermined correlation where the third identifier is based on the first identifier. In some embodiments, the third identifier is a universal identification number and the identification system is a governmental entity. In one embodiment, the server computer is part of a terminal. In other embodiments, the server computer can be part of an acquirer.

The present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

In embodiments, any of the entities described herein may be embodied by a computer that performs any or all of the functions and steps disclosed.

Any recitation of "a", "an" or "the" is intended to mean "one or more" unless specifically indicated to the contrary.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A server computer comprising:
a processor and a computer-readable storage medium coupled to the processor, the computer readable storage medium comprising code executable by the processor for implementing a method comprising:
receiving an authorization request message originating from a user, wherein the authorization request message includes financial transaction data, and wherein the authorization request message further includes an authentication request message encoded therein, the authentication request message including payment account data and biometric data;
determining a universal identification (UID) based on the payment account data;
sending the biometric data and UID to an identification (ID) server computer of an identification system to determine if the biometric data and the UID have a predetermined correlation; and
receiving confirmation from the identification system that the user is authenticated if the identification system determines that the biometric data and UID have the predetermined correlation.

2. The server computer of claim 1 wherein the biometric data is one or more of finger print data, digital photograph data, palm print data, hand geometry data, iris recognition data, or retinal scan data.

3. The server computer of claim 1 wherein the authentication request message further includes at least one of user account balance data or account history data.

4. The server computer of claim 1 wherein the method further comprises extracting the authentication request message from the authorization request message.

5. The server computer of claim 1 wherein the method further comprises sending an authorization request message to an issuer if confirmation is received that the biometric data and the UID have the predetermined correlation.

6. The server computer of claim 1 wherein the authentication request message further includes one or more of demographic data or geographic data.

7. The server computer of claim 1 wherein the method further comprises sending an authorization request message to an issuer at substantially the same time that the biometric data and the UID are sent to the ID server computer.

8. The server computer of claim 1 wherein a payment processing network performs the sending the biometric data and UID to the identification system.

9. The server computer of claim 1 wherein the method is performed by one or more of a terminal, an acquirer, or an issuer.

10. The server computer of claim 1 wherein the payment account data may include one or more of a bank identification number (BIN), a card verification value (CVV), an expiration date, a phone number, or an address.

11. A method comprising:
receiving, by a computer, an authorization request message originating from a user, wherein the authorization request message includes financial transaction data, and wherein the authorization request message further includes an authentication request message encoded therein, the authentication request message including payment account data and biometric data;
determining, by the computer, a universal identification (UID) based on the payment account data;
sending, by the computer, the biometric data and UID to an identification (ID) server computer of an identification system to determine if the biometric data and the UID have a predetermined correlation; and
receiving, by the computer, confirmation from the identification system that the user is authenticated if the identification system determines that the biometric data and UID have the predetermined correlation.

12. The method of claim 11 wherein the biometric data is one or more of finger print data, digital photograph data, palm print data, hand geometry data, iris recognition data, or retinal scan data.

13. The method of claim 11 wherein the authentication request message further includes at least one of user account balance data or account history data.

14. The method of claim 11 wherein the method further comprises extracting the authentication request message from the authorization request message.

15. The method of claim 11 wherein the method further comprises sending an authorization request message to an issuer if confirmation is received that the biometric data and the UID have the predetermined correlation.

16. The method of claim 11 wherein the authorization request message further includes one or more of demographic data or geographic data.

17. The method of claim 11 wherein the method further comprises sending an authorization request message to an issuer at substantially the same time that the biometric data and the UID are sent to the ID server computer.

18. The method of claim 11 wherein a payment processing network performs the sending the biometric data and UID to the identification system.

19. The method of claim 11 wherein the method is performed by one or more of a terminal, an acquirer, or an issuer.

20. The method of claim 11 wherein the payment account data may include one or more of a bank identification number (BIN), a card verification value (CVV), an expiration date, a phone number, or an address.

* * * * *